United States Patent
Dunn

(10) Patent No.: US 8,387,382 B1
(45) Date of Patent: Mar. 5, 2013

(54) DIESEL ENGINE WITH AIR BOOSTED TURBOCHARGER

(75) Inventor: Paul M. Dunn, West Kingston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 386 days.

(21) Appl. No.: 12/787,569

(22) Filed: May 26, 2010

(51) Int. Cl.
*F02B 33/44* (2006.01)

(52) U.S. Cl. ............ 60/606; 60/605.1; 60/605.2; 60/624

(58) Field of Classification Search .................. 60/606, 60/605.1, 605.2, 624
See application file for complete search history.

(56) References Cited

U.S. PATENT DOCUMENTS

| | | | | |
|---|---|---|---|---|
| 3,676,999 A * | 7/1972 | Oldfield | ........................ | 60/606 |
| 5,074,115 A * | 12/1991 | Kawamura | ...................... | 60/608 |
| 7,779,634 B2 * | 8/2010 | Barthelet et al. | ............... | 60/607 |
| 2008/0282699 A1 * | 11/2008 | Barthelet et al. | | |

FOREIGN PATENT DOCUMENTS

WO    WO 2006022635 A1 *   3/2006

* cited by examiner

*Primary Examiner* — Ching Chang
(74) *Attorney, Agent, or Firm* — James M. Kasischke; Michael P. Stanley; Jean-Paul A. Nasser

(57) ABSTRACT

A booster mechanism is selectively connected to an exhaust turbine which consequently powers an intake air compressor. The booster mechanism applies additional power to the exhaust turbine in order to give the engine full or near full torque above idle revolutions per minute (RPM). In one embodiment, the booster mechanism comprises an air flask which contains pressurized air or another pressurized air source that can be utilized to provide a pressure source for additional power to the exhaust turbine.

1 Claim, 4 Drawing Sheets

US 8,387,382 B1

DIESEL ENGINE WITH AIR BOOSTED TURBOCHARGER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates generally to turbocharged engines and, more particularly, to the improved operation of turbocharged engines at low Revolutions-Per-Minute (RPM).

2. Description of the Prior Art

Diesel engines may be either 2-Stroke or 4-Stroke cycle. Diesel engines differ from gasoline engines in that ignition occurs as a result of the heat from near-adiabatic compression. As historically-implemented, the naturally-aspirated diesel is a high compression ratio engine (typically between 16 and 22 to 1). As such, the compression ratio is approximately twice the compression ratio of a gasoline engine. Diesel engines therefore have lower power to weight ratio than gasoline engines. Modern high speed diesel engines have largely compensated for the inherent weight penalty of the diesel engine by the use of turbo-charging and after-cooling.

In the turbocharged and after-cooled marine diesel, the waste heat in the exhaust (typically about 1000 degrees Fahrenheit at full load) is used to spin a turbine, which drives a compressor which consequently boosts the intake manifold pressure. The combination of the pressurized intake manifold and the aftercooler (or intercooler), which cools the air downstream of the compressor, increases the power of the turbocharged diesel by a factor of approximately two or three. This is comparable to the power to weight ratio of gasoline engines.

With a turbocharged engine, the power at low RPMs may be one third or less of the power at higher RPMs. For example, a typical high speed diesel may be rated at 370 horsepower at 2400 RPMs; the diesel rates being approximately 75 horsepower at 1000 RPM. This low horse power condition is because at low RPMs there is not sufficient exhaust flow to spin the turbocharger fast enough to create a boost in horsepower.

In many applications, this difference in horsepower at different RPMs is not important because transmissions or gear boxes may be utilized to adjust the load to allow fast acceleration of the engine to higher speeds. With boats, various means have been utilized to minimize or avoid this problem including the use of variable pitch propellers, gearboxes, engine-powered superchargers, and operationally-comparable mechanisms. Larger engines may also be utilized. However, these solutions add considerable costs.

When planning craft of 20-50 feet in length, operating at top speeds of 25-50+ knots, the most efficient propulsor at design point (top speed) will generally be a fixed pitch propeller. With the fixed pitch propeller (surface piercing or not), unless slip is significant, speed tends to be more or less linear with the RPM. As a result, the engine tends to be at a low RPM when the vessel is required to "climb out of the hole "onto" plane.

If the vessel has a low-to-moderate top speed compared to the hull speed (2-2.5 times hull speed or less); generally there is no problem. The engine will be above the critical one-half rated speed point and will have the ability to develop boost and power before that power is needed to transition to a plane condition. However, as designs for faster speeds are made (3-5 times hull speed), a situation can exist where if the vessel is perfectly "propped" for the full speed condition there will not be significant (or in some cases any) excess power and the vessel will either be slow to get onto plane, or may be unable to transition to a plane condition.

As an example, a 33 foot craft with a 22,000 lb. displacement powered by two 370 hp diesels, a top speed in excess of 32 knots can be achieved at the proper RPM (2825). When fuel and water loads are increased to full (an additional 1500 lb. displacement) the vessel cannot transition onto plane in shallow water, and in deeper water requires 20-30 seconds at full throttle from a standing start before any boost pressure is obtained. During this 20-30 second period of time, the vessel runs at 9-10 knots and smokes. Once the boost starts, the vessel breaks onto plane and accelerates to top speed in less than ten seconds. The compromise solution is to reduce the propeller diameter by 1" from 22"×24" to 21"×24". This solution sacrifices 3 knots of top speed (new speed 29 knots) but allows sufficient slip during acceleration that boost is achieved in 8 seconds or less. A ten percent pitch reduction at the same diameter (considered) would have had the same effect.

Neither solution is acceptable for naval applications. Navy craft need good performance/efficiency over a much wider range of load conditions than is typical of most vessels. In addition, smoke is created during this temporary overload (fuel rich condition). Engines which have electronic controls or other fuel/smoke limiters have an even greater problem with this transition.

The above-discussed solutions such as gearboxes, larger engines, and the like might be utilized, but the cost is high. The following United States Patents describe various prior art systems that may be related to the above and/or other turbocharger systems:

U.S. Pat. No. 4,392,352 (issued Jul. 12, 1983) to Stumpp et al, discloses a method and an apparatus for regulating and attaining an anti-overload means in turbochargers and in internal combustion engines equipped therewith, serving in cost-favorable embodiment both in Otto (gasoline) engines and in diesel engines to limit the air throughput of the engine in accordance with the engine speed and to provide that neither the turbocharger (as a result of exceeding its limit rpm) nor the engine can be endangered if the engine exceeds the permissible compression and combustion pressure.

In summary, the intent is to attain a favorable adjustment of the exhaust turbocharger over the entire RPM range of the internal combustion engine. To this end, the exhaust gas quantity delivered to the exhaust turbocharger is controlled in accordance with the throughput, that is, in accordance with the air quantity delivered to the engine, with the aid of a bypass line. The air quantity delivered by way of the compression area of the exhaust turbocharger of the engine is detected ahead of the exhaust turbocharger, either with the aid of a direct air flow rate meter, or by means of a throttle restrictor and the detection of the underpressure being created at that point.

U.S. Pat. No. 5,131,229 (issued Jul. 21, 1992) to Kriegler, discloses that in order to utilize recycling of exhaust gases at high engine loads in an internal-combustion engine with an exhaust gas turbocharger, optionally with a charge cooler, as well as an exhaust gas recycling valve which is arranged within a connecting pipe through which a partial exhaust gas stream flows, the connecting pipe, in the direction of the flow, branching from the exhaust pipe upstream of the exhaust gas turbine and connecting into the charge pipe downstream of the exhaust gas turbine, an apparatus is employed which injects water into the partial exhaust gas stream flowing the connecting pipe at operating temperature and at high load operation of the internal-combustion engine.

U.S. Pat. No. 6,422,008 (issued Jul. 23, 2002) to Voss et al, discloses methods and apparatus for reducing the RPM level of a diesel engine exhaust stream by providing a suitable oxidation catalyst into the exhaust train. The oxidation catalyst may be incorporated into a thermal insulative coating on the inner surface of the exhaust train-particularly the exhaust manifold and exhaust pipes prior to the turbocharger. Alternatively, when the exhaust train includes a turbocharger, the catalyst can be in a separate monolithic unit between the engine and the turbocharger. The system may also include an improved diesel oxidation catalyst unit having a metal monolithic substrate. The oxidation catalyst can also be incorporated into a thermal insulative coating inside the cylinders, particularly on non-rubbing surfaces. A further embodiment is the use of a stainless steel bond coat to bind the thermal coating to a metallic substrate, particularly an aluminum substrate.

U.S. Pat. No. 6,470,866 (issued Oct. 29, 2002) to Cook, discloses an apparatus for and method of exhaust gas recirculation in an internal combustion engine that operates with charge air boost. An EGR valve has an inlet port communicated to the engine exhaust system upstream of a throttle valve in the tailpipe and an outlet port communicated to the engine intake system. The throttle valve is controlled to selectively restrict exhaust gas flow through the tailpipe so as to maintain the difference between pressure at the EGR valve inlet and pressure at the EGR valve outlet substantially unaffected by changes in pressure in the intake system and in the exhaust system.

U.S. Pat. No. 6,557,347 (issued May 6, 2003) to Alvarez et al, discloses a method and apparatus of operating a turbocharged diesel locomotive engine to facilitate controlling pressure in an engine cylinder. The method includes determining an allowable peak firing pressure for the turbocharged diesel engine; determining an actual peak firing pressure; and comparing the allowable peak firing pressure to actual peak firing pressure to control the operation of the turbocharger for controlling peak firing pressure. The apparatus includes a diesel engine including an intake manifold, an exhaust manifold, an electronic fuel controller, a turbocharger, and a motor-generator coupled to the turbocharger and operable to at least one of increased turbocharger rotational speed, decrease turbocharger rotational speed, and maintain turbocharger rotational speed, and a controller including a first input corresponding intake manifold air pressure and a second input corresponding to fuel injection timing for the engine and including as an output a motor-generator configuration signal.

U.S. Pat. No. 6,637,382 (issued October 28) 2003, to Brehob et al, discloses a turbocharger system for a diesel engine includes an exhaust driven intake air compressor, a sensor for tracking the position of the engine's throttle and for generating a throttle position signal, and a water injection system for furnishing water to the engine's air intake. A controller receives the throttle position signal and operates the water injection system such that the rate of water injection will be increased in the event that the time rate of change of the throttle position signal indicates that the throttle pedal is being depressed at a rate exceeding a predetermined threshold.

U.S. Pat. No. 6,955,162 (issued Oct. 18, 2005) to Larson et al, discloses an exhaust gas recirculating system for a turbocharged diesel engine utilizes an electrically driven compression pump to boost exhaust gas pressure before return to the engine induction system. Exhaust gas is drawn from the exhaust system or stack some distance removed and downstream from the outlet from the exhaust turbine, compressed to overcome the intake manifold boost pressure, and returned to the intake system along an extended pipe to cool the gas. The compressor is energized from the vehicle battery during periods of demand for ak pressure demand on the engine thereby recycling recaptured energy from the battery to boost engine output. Exhaust turbine performance during periods of peak loading is also improved.

The above-cited prior art does not adequately disclose a low cost way to improve the operation of a turbocharger powered internal combustion engine at low RPMs. Consequently, those skilled in the art will appreciate the present invention that addresses the above and other problems.

SUMMARY OF THE INVENTION

It is therefore a primary object and general purpose of the present invention to improve the performance of turbocharger-powered internal combustion engines at low RPMs.

It is a further object of the present invention to inexpensively and reliably enhance the operation of a turbocharger starting at an idle speed.

Accordingly, the present invention provides an acceleration system for an internal combustion engine wherein the engine includes an intake and an engine exhaust. The system may comprise one or more elements such as a turbocharger with an inlet air compressor. The intake air compressor is operable to compress air for application to the intake and an exhaust turbine connected to the engine exhaust so that exhaust from the engine exhaust rotates the exhaust turbine. A rotatable shaft connects between the exhaust turbine and the intake air compressor.

A booster mechanism is operable to rotate the exhaust turbine and a selective connector is operable to selectively connect the booster mechanism for operation during acceleration and to disconnect the booster mechanism from exhaust turbine when the booster mechanism is not needed.

In one possible embodiment, the booster mechanism comprises an air flask with compressed air and the selective connector comprises a valve. In one variant of this embodiment, the valve selectively connects the compressed air from the air flask to the engine exhaust at a position upstream from the exhaust turbine.

In another variant, the booster mechanism further comprises a boost turbine and the selective connector further comprises a clutch. The valve connects the compressed air from the air flask to the boost turbine and the clutch mechanically connects the boost turbine to the exhaust turbine.

In another embodiment, the booster mechanism comprises a high speed motor compressor operable to selectively supply compressed air to the engine exhaust upstream of the exhaust turbine. An electrically controlled switch is utilized to connect or disconnect the boost power applied to the exhaust turbo.

In another embodiment, the booster mechanism comprises a high speed motor, and the selective connector comprises a clutch which selectively mechanically connects the high speed motor to the exhaust turbine.

The present invention also provides an acceleration method for the internal combustion engine. Steps of the method comprise providing an inlet air compressor operable to compress air for application to the intake; providing an exhaust turbine connected to the engine exhaust so that air from the engine exhaust rotates the exhaust turbine; and providing that a shaft connects between the exhaust turbine and the intake air compressor mounted so that the intake air compressor is powered by the exhaust turbine.

Other steps comprise providing a booster mechanism to rotate the exhaust turbine when additional acceleration is required and providing a selective connector operable to selectively connect the booster mechanism for operation during acceleration and to disconnect the booster mechanism from exhaust turbine. Other steps comprise utilizing an air flask with containing compressed air for the booster mechanism and utilizing a valve for the selective connector. The acceleration method comprises providing that the valve selectively connects the compressed air from the air flask to the engine exhaust at a position upstream from the exhaust turbine.

Alternatively, the acceleration method comprises providing that the booster mechanism further includes a boost turbine and the selective connector further includes a clutch, whereby the valve connects the compressed air from the air flask to the boost turbine, and whereby the clutch mechanically connects the boost turbine to the exhaust turbine.

In one embodiment, the method comprises providing that the booster mechanism includes a high speed electric motor compressor which can be switched on to selectively supply compressed air to the engine exhaust upstream of the exhaust turbine.

In another embodiment, the method comprises providing that the booster mechanism includes a high speed motor, and providing the selective connector includes a clutch which selectively mechanically connects the high speed motor to the exhaust turbine.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION OF THE INVENTION

Figure 1:
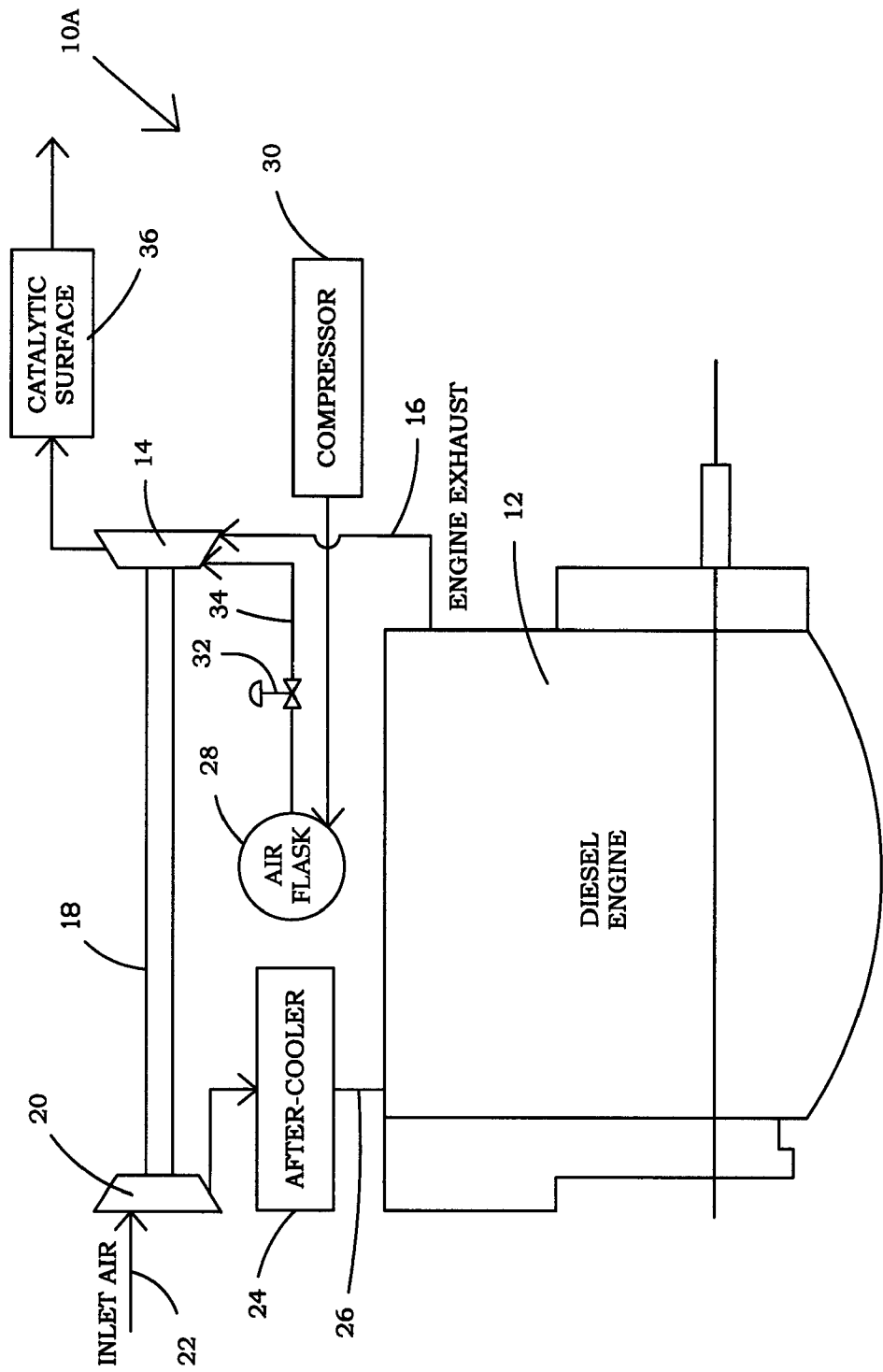
FIG. 1 is a schematic of an engine with a valve-controlled compressed air mechanism capable of temporarily boosting output of the otherwise exhaust-powered turbine of a turbocharger in accordance with one embodiment of the present invention.

Referring now to the drawings, and more specifically to FIG. 1, there is shown system 10A in accordance with one embodiment of the present invention. In this embodiment, a diesel engine 12 utilizes a conventional turbocharger comprising an exhaust turbine 14—powered by an engine exhaust 16. The exhaust turbine 14 drives a shaft 18 which consequently rotates compressor turbine 20. The compressor turbine 20 compresses inlet air 22, which is cooled by an aftercooler or intercooler 24. This cooled, compressed air is then provided to an inlet manifold 26 of the diesel engine 12.

In the embodiment of FIG. 1, the amount of air flow to the exhaust turbine 14 can be selectively augmented by pressurized air from an air flask 28. An air compressor 30 may be a small electric or engine-mounted compressor to maintain pressure in the air flask 28, which may be several hundred pounds per square inch.

In one embodiment, the air pressure may be approximately 150 pounds per square inch. The air flask 28 may be about one to two cubic feet in size. When rapid acceleration is desired, near full throttle is applied and an air valve 32 is opened. Pressurized air 34 from the air flask 28 is injected into the exhaust manifold upstream of the exhaust turbine 14. After sufficient boost pressure is detected at the compressor turbine 20 discharge, and/or until the RPM reaches a predetermined level, then the air valve 32 may be closed.

With the addition of the components and system above, the turbo-charged diesel should be capable of near peak torque, at above idle speed (although only for a few tens of seconds, approximately idle speed depending on the size of the air flask 28). Calculations indicate that the size of the air flask 28, the compressor 30, and the associated control system will be significantly less than the alternatives (supercharger, or two speed transmission).

In one example, a one-cubic foot flask at ten atmospheres with a (modest pressure of 150 psi) is expected to be able to provide full boost for more than ten seconds in the 330 cubic inch engine. This boost should be more than sufficient to transition quickly to speeds sufficient for an exhaust turbo-powered engine boost. It is likely that a higher pressure and a smaller flask might actually be used.

An injector nozzle (not shown) may be designed or oriented upstream towards the exhaust turbine 14 in a manner which causes the high speed jet of the pressurized air 34 to entrain engine exhaust; thereby, reducing engine backpressure.

Thus, full torque or near full torque is at available at low RPMs with the acceleration being nearly smoke-free and NOx emissions reduced. Due to simple construction of the system, reliability is high.

A catalytic surface 36 may or may not be utilized either downstream of the exhaust turbine 14 as shown or in another embodiment upstream. Exhaust gas may also be recirculated to reduce emissions. In one variant of the invention, the catalytic surface 36 is utilized in the exhaust manifold and, when temperatures are high enough, unburnt fuel/soot is oxidized in the exhaust manifold which may be sufficient to provide a small additional boost to the exhaust turbine 14. With the addition of the catalytic surface 36 at a position in the exhaust system, and with use of the air flask 28, the diesel 12 should be capable of near peak torque at above idle and with a substantial reduction in the typical burst of soot and smoke during initial acceleration.

Figure 2:
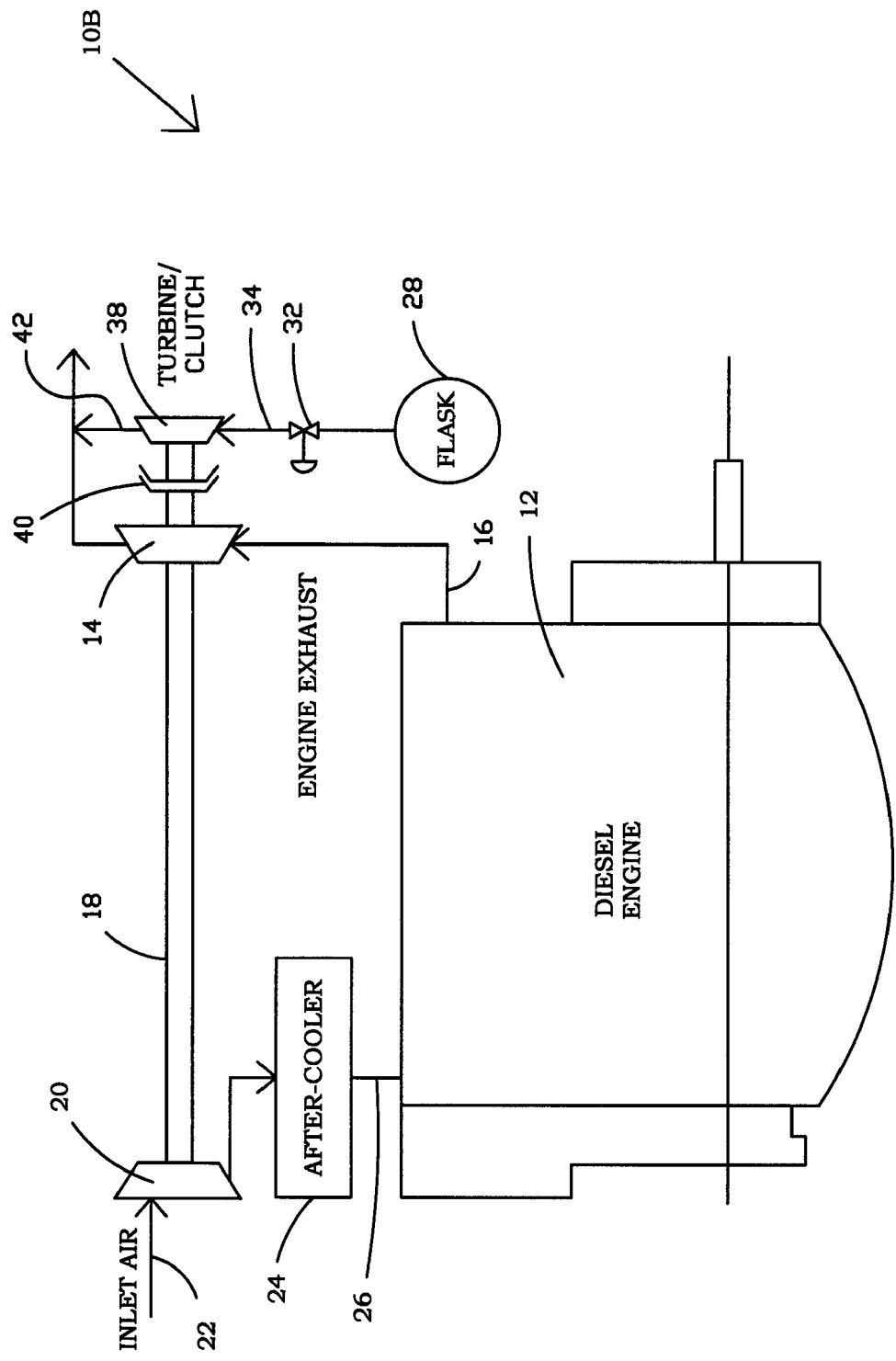
FIG. 2 is a schematic of an engine with a valve-controlled compressed air mechanism and a clutch-controlled mechanism capable of selectively boosting or adding power to the exhaust-powered turbine of a turbocharger in accordance with one embodiment of the present invention.

FIG. 2 depicts another embodiment of the invention. In this embodiment, pressurized air from the flask 28 is utilized to drive an acceleration boost turbine 38, which can be engaged/disengaged to the exhaust turbine 14 utilizing a clutch 40. Essentially, the same compressor (not shown in this embodiment), valve, and flask as discussed hereinbefore to power the acceleration boost turbine 38.

The clutch 40 provides that the mass of the boost turbine 38 is disconnected from the exhaust turbine 14 when not in use. This embodiment ensures that there is no increase in back pressure from the engine exhaust 16 at the exhaust manifold upstream of the exhaust turbo 14 thereby even further increasing the flow of air through the diesel engine 12. The pressurized air from the pressurized flask 28 is exhausted downstream of the exhaust turbine 14—as indicated at 42.

Figure 3:
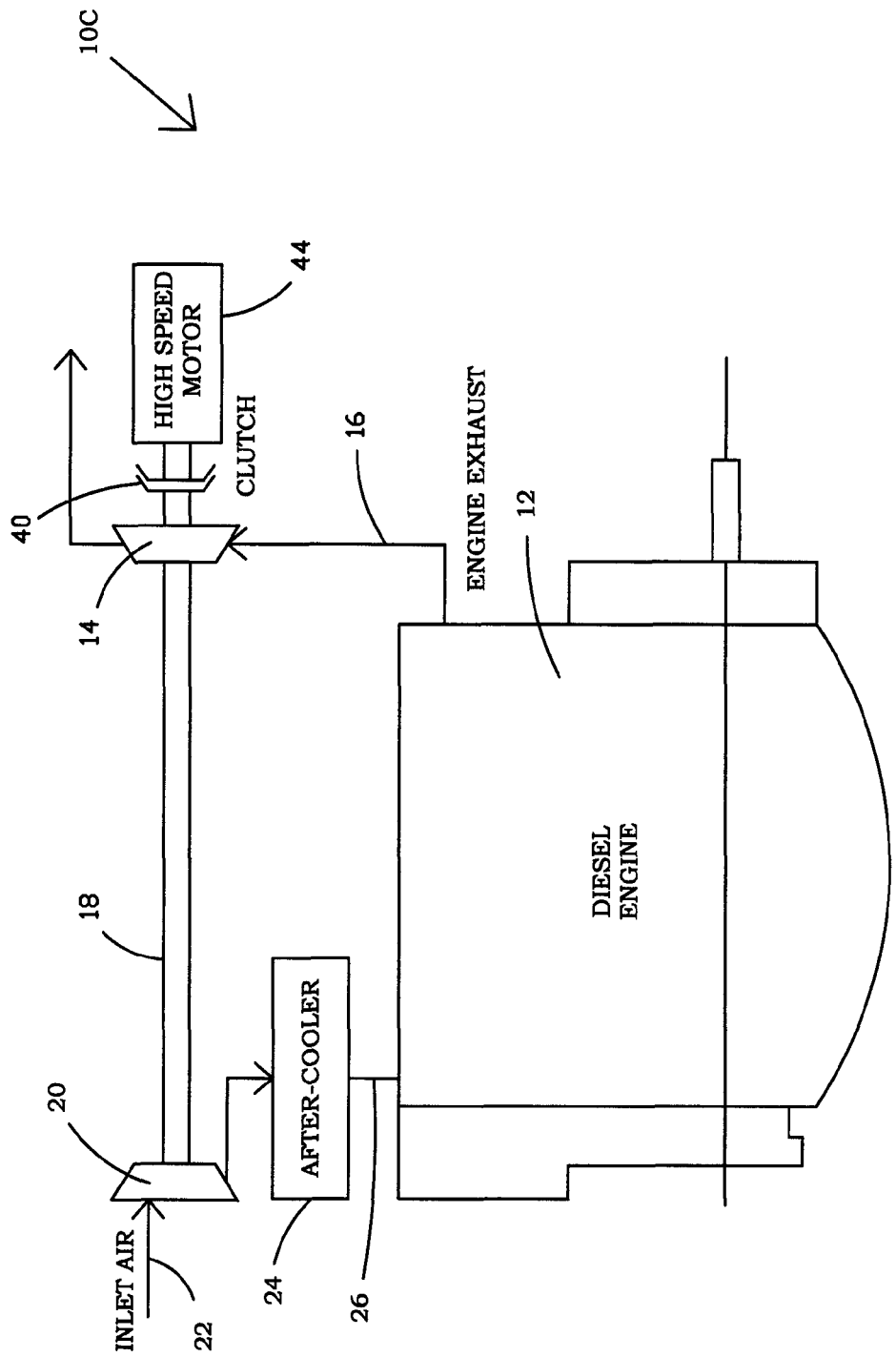
FIG. 3 is a schematic of an engine with a clutch-connected high speed motor capable of selectively boosting or adding power to the otherwise exhaust-powered turbine of a turbocharger in accordance with one embodiment of the present invention.

Referring now to FIG. 3, there is shown another embodiment of the invention wherein a high speed motor 44 may be utilized to provide boost power to the exhaust turbine 14 through the high-speed motor clutch 40 to provide improved acceleration of the diesel engine 12. The clutch 40 may comprise a simple centrifugal clutch or other type of clutch. When rapid acceleration is desired, the high speed motor 44 augments the exhaust turbine 14 to quickly spin up the compressor turbine 20 and to provide boost. When boost is achieved power from the high speed motor 44 is removed. The high speed motor 44 may comprise an electric motor and battery combination.

Figure 4:
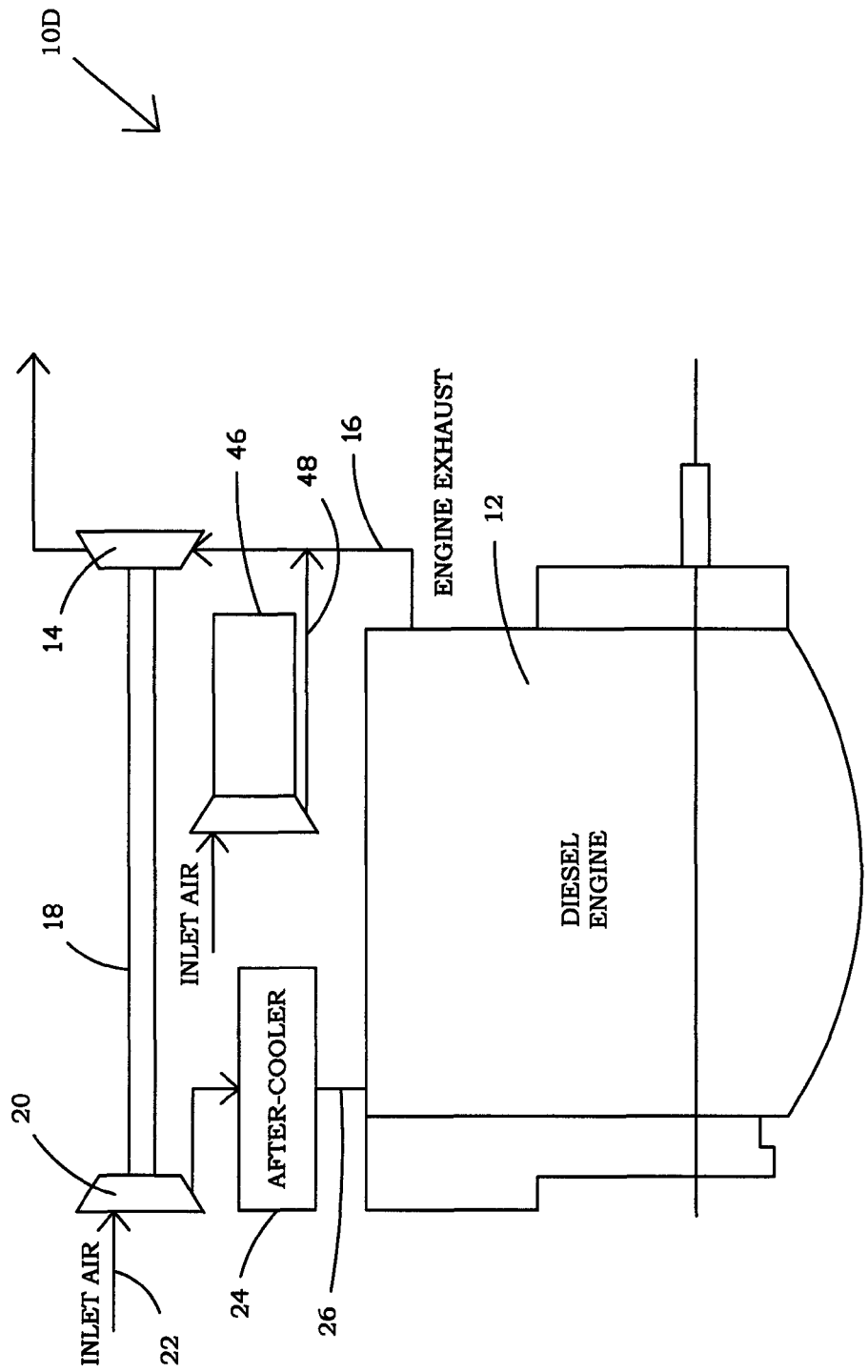
FIG. 4 is a schematic of an engine with a high speed motor compressed air mechanism capable of selectively boosting or adding power to the otherwise exhaust powered turbine of a turbocharger in accordance with one embodiment of the present invention.

FIG. 4 depicts another embodiment of the present invention wherein a high speed motor compressor 46 is utilized to apply compressed air 48 upstream of the exhaust turbine 14; thereby, providing immediate near peak torque for acceleration above idle speed. The size of the required high speed motor compressor 46 is significantly less costly than the alternatives, such as an engine driven supercharger or a two speed transmission.

Variants on the above disclosed embodiments are possible which result in increasing intake manifold pressure directly or indirectly. Each of the above embodiments produce full torque or near full torque at low RPM or just above idle. The acceleration is near smoke free and has reduced emissions.

While the invention has been described in terms of turbocharged diesel engines, the invention may also be applied to gasoline engines. Many commercial automobiles utilize turbochargers, which have the same sluggish operation at relatively low RPMs. The present invention provides a solution to this sluggish operation which is much less expensive than twin turbochargers or the like.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. An acceleration system for an internal combustion engine in which the engine includes an intake and engine exhaust, said system comprising:

an inlet air compressor operable to compress air for the intake;

an exhaust turbine operationally connected to the engine exhaust wherein said exhaust turbine is capable of rotation by the engine exhaust;

a shaft operationally connected between said exhaust turbine and said intake air compressor with said shaft mounted so that said intake air compressor is capable of being powered by said exhaust turbine;

an air flask capable of containing compressed air and fluidly connected to said exhaust turbine with said air flask capable of providing the compressed air to rotate said exhaust turbine;

a valve fluidly positioned between said air flask and said exhaust turbine wherein said valve is capable of selectively connecting the compressed air in said air flask to the engine exhaust upstream from said exhaust turbine; and a motor compressor fluidly connected to said air flask with a fluid connection separate from the fluid connection between said air flask and said exhaust turbine wherein said motor compressor is capable of providing the compressed air to said air flask.

\* \* \* \* \*